Feb. 24, 1970   F. R. BARNET   3,497,864
UNDERWATER ELECTRICAL CABLE CONNECTOR
Filed June 27, 1968

INVENTOR
F. Robert Barnet
BY
ATTORNEYS

United States Patent Office 3,497,864
Patented Feb. 24, 1970

3,497,864
UNDERWATER ELECTRICAL CABLE CONNECTOR
Fredrick R. Barnet, Kensington, Md., assignor to the United States of America as represented by the Secretary of the Navy
Filed June 27, 1968, Ser. No. 740,605
Int. Cl. H01r 7/06, 13/54
U.S. Cl. 339—60                      9 Claims

ABSTRACT OF THE DISCLOSURE

An underwater electrical cable connector for withstanding deep submergence pressures wherein each of the ends of the two cables to be connected is encased in a hollow cone with one of the cones configured to fit within the other. A molded threaded connector housing constructed of whiskered graphite fibers and resin matrix wedges the ends of the cables to securely fasten the same and seal them from the exterior environment.

BACKGROUND OF THE INVENTION

The present invention generally relates to coupling devices and more particularly to a coupling device for connecting the free ends of one or more cables.

Couplings employed in the connection of electrical cables in a deep underwater environment, such as exist at 20,000 feet, are subjected to substantial hydrostatic pressures which may cause failure of the coupling. In order to resist the destructive forces exerted at this depth and at the same time maintain positive electrical contact between the ends of the electrical cables, the couplings are constructed of metallic material. These units, however, have been subject to substantial corrosive effects, particularly in sea water, which both weaken the structural integrity of the coupling and increase the likelihood of water reaching the wire conductors. When non-metallic materials such as reinforced plastics were used in the construction of the coupling member, the resulting arrangement eliminated the problem of corrosion but was unable to supply either the omnidirectional high strength and stiffness characteristics necessitated by the aforesaid substantial hydrostatic pressures or the construction which would maintain positive electrical contact between the ends of the electrical cables.

SUMMARY OF THE INVENTION

Accordingly, it is an object of the present invention to provide an improved coupling device for effectively interconnecting the free ends of one or more cables.

Another object of this invention is the provision of a coupling device which may be effectively and reliably utilized in an underwater environment.

Still another object of the present invention is to provide an improved coupling device capable of withstanding the hydrostatic pressures incident to a deep underwater environment.

A further object of this invention is to provide a coupling device for electrical cables capable of resisting the destructive hydrostatic forces incident to use in a deep underwater environment while at the same time maintaining positive electric contact between the ends of the electrical cables.

A still further object is to provide an improved coupling device which is capable of being used in an underwater environment and which will effectively resist the corrosive effects of the water environment.

Another object of this invention is the provision of a coupling device which is capable of use in a deep underwater environment and which resists corrosion and provides ominidirectional high strength and stiffness characteristics sufficient to resist the destructive hydrostatic forces incident to such deep underwater environments.

It is a still further object of the present invention to provide an electrical cable connecting apparatus for use in a deep underwater environment in which the ability to withstand leakage increases with increased hydrostatic pressures.

Another object of the present invention is to provide an underwater electrical cable connector in which the electrical contacts are sealed against a leakage and such seals increase in effectiveness with increases in hydrostatic pressure.

According to the present invention, the foregoing and other objects are attained by a cable connecting apparatus in which the ends of the cables to be connected are formed with tapered, mutually interfitting wedge-shaped bodies and in which threaded fiber reinforced plastic housing members surround each of the ends of the cables and wedgingly fastens the ends together when the members are brought into threaded engagement.

BRIEF DESCRIPTION OF THE DRAWING

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENTS

Figure 1:
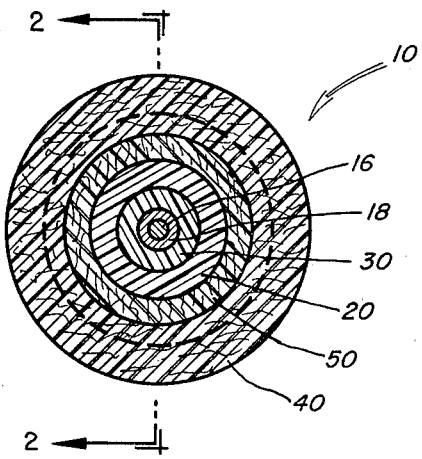
FIG. 1 is a transverse cross-sectional view of the cable connecting apparatus.
Figure 2:
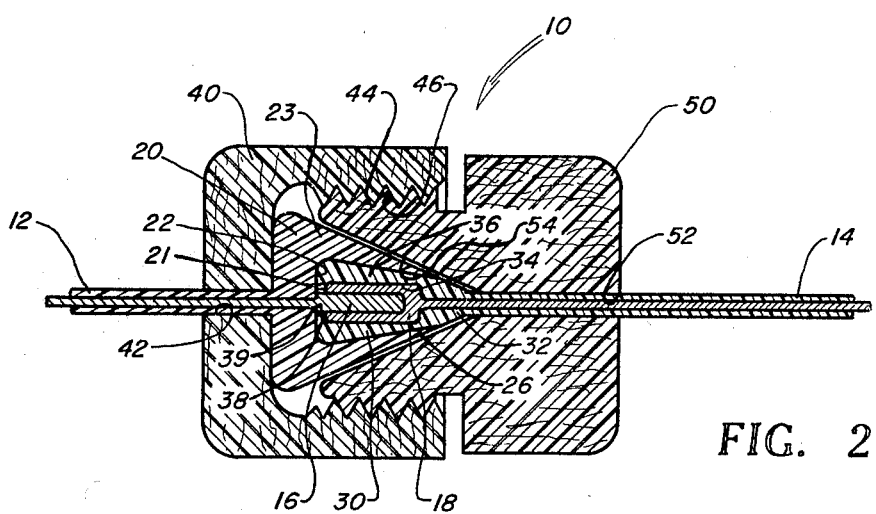
FIG. 2 is a cross-sectional view taken along the line 2—2 of FIG. 1 with the housing members in loose threaded interengagement.

Referring now to the drawings wherein like reference characters designate identical or corresponding parts throughout the several views, and more particularly to FIGS. 1 and 2 thereof, the cable connecting arrangement generally indicated at 10 is utilized to electrically couple and connect insulated wire conductors 12 and 14. As viewed more clearly in FIG. 2, the insulated wire conductor 12 terminates in a pin 16 while conductor 14 terminates in a compatible socket 18, both structures of the type known and used in the art for electrical coupling.

Formed at the end of conductor 12 and surrounding the associated pin 16 is a hollow truncated cone-shaped body 20 formed of a moldable polymeric insulating material such as polyethylene, or the like. This cone 20 is anchored at its base 21 to the wire conductor 12 and integrally formed with the insulation of conductor 12 by injection molding techniques known and used in the art. The hollow interior or cavity of cone 20, shown at 22, is also of generally cone-shaped configuration and is bounded by a continuous flexible side wall 23 which is connected to the base 21. Pin 16 extends into the cavity 22 through the base 21 and an opening 24 at the apex 26 of the cone 20 provides access to the cavity 22 and the aforementioned pin 16.

A cone shaped body 30 of a material similar to that described hereinabove with reference to cone 20 is formed at the terminal portion of wire conductor 14 and of a size shape to fit compatibly within the interior cavity 22 of cone 20. In order to permit such an interfitting arrangement the cone 30 is integrally attached to the insulation of conductor 14 at the apex 32 thereof and the socket 18 extends through the apex 32 into the interior or cavity 34 of the cone 30. Side walls 36 surround the socket 18 and terminate in a base 38 having an opening 39 therethrough providing the required access to socket 18.

A female coupling member 40 surrounds the cone 20 and is provided with a central aperture 42 through which the wire conductor 12 passes and is internally threaded at 44 to threadably receive the externally threaded portion 46 of a male connector 50. Connector 50 is centrally bored therethrough at 52 to slidably house the wire conductor 14. Bore 52 becomes outwardly flared or tapered at 54 and configured to wedgingly receive the cone-shaped body 20 formed on wire conductor 12 when members 40 and 50 are brought into threaded engagement.

In order to resist the corrosive effect of underwater use and in order to withstand the hydrostatic forces incident to deep submergence of the apparatus 10, members 40 and 50 are constructed of a reinforced plastic material which will provide omnidirectional strength and stiffness. This is accomplished by use of a transfer and compression molding technique of the type known and used in the arts, for example, as used in making plastic articles of glass-filled epoxy, in which the molding compounds consist of whiskered graphite fibers and an epoxy resin binder. The whiskered fiber is of that species of reinforcing fiber in which whiskers, or filamentary single crystals, of silicon carbide, or the like, are grown on the graphite fiber. One process for growing silicon carbide crystals is a vapor deposition process and such process is known and used in the art and does not form any part of the invention herein. Basically, whiskers are grown in this process by a vapor transport mechanism in which reactive species of the elementary substance found in the whisker are produced in a vapor form. The equilibrium of the vapor-solid crystallization rate is controlled by the reactive vapor species in which low super saturations grow few and large whiskers while high super saturations grow a multitude of fine whiskers. These reactive vapors are generally produced in a controlled atmospheric furnace with temperatures in the 2000 to 3000° F. range.

Figure 3:
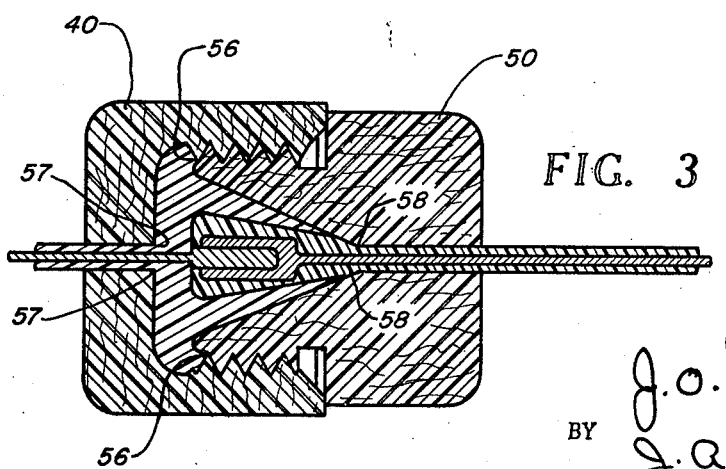
FIG. 3 is a view similar to FIG. 2 with the housing members brought into complete threaded interengagement.

As viewed in FIG. 3, when the members 40 and 50 are threaded into a tight fitting relationship, the body 20 deforms to fill adjacent open spaces and provide seals at 56, 57 and 58 to seal the electrical contacts 16 and 18 from the external water environment. It should be observed that the effectiveness of these seals 56, 57 and 58 increases as hydrostatic pressure builds upon the outside surfaces of the members 40 and 50.

In operation, the ends of conductors 12 and 14 are brought into engagement with pin 16 inserted in socket 18 and body 30 positioned within the cavity 22 of body 20. When the coupling members 40 and 50 associated with the conductors 12 and 14 respectively are brought into threaded engagement, the tapered surface 54 of member 50 wedges and deforms body 20 to fill existing voids and provides seals 56, 57 and 58 to seal the interior of the coupling arrangement 10 against water seepage. Hydrostatic pressure tending to deform the members 40 and 50 further force and deform body 20 to fill any still existing voids thereby further enhancing the sealing effectiveness of the body 20 and precluding water seepage notwithstanding the increased hydrostatic forces attempting to urge water into the interior sections of the cable connecting arrangement 10.

Obviously, numerous modifications and variations of the present invention are possible in the light of the above teachings.

What is claimed as new and desired to be secured by Letters Patent of the United States is:

1. A connecting apparatus for coupling cable ends, comprising:
   a first deformable body member secured to one cable end having an interior cavity and an opening formed therein providing access to said cavity;
   a second body member fixedly attached to an other cable end and configured to fit within said interior cavity of said first body member;
   a threaded female coupling element having an interior surface surrounding said first body member and said one cable end;
   a threaded male coupling element surrounding said second body member and said other cable end;
   said male coupling element including means for wedging said first body member against said second body member and against a portion of said interior surface of said female coupling element to securely fasten said cable ends and seal the same from the exterior environment.

2. The connecting apparatus as defined in claim 1 wherein said first deformable body member is of a truncated cone-shaped configuration having the base thereof fixedly secured to said one cable end.

3. The connecting apparatus as defined in claim 2 wherein said first body member includes an interior cavity of a shape substantially conforming to the exterior configuration of said body member.

4. The connecting apparatus as defined in claim 3 wherein said means for wedging said first body member against said second body member and against a portion of said interior surface of said female coupling element includes a conical surface on said male coupling element conforming to said shape of said first body member.

5. A connecting apparatus as defined in claim 4 wherein said cable ends terminate in mutually interfitting pin and socket elements.

6. The connecting apparatus as defined in claim 5 wherein said threaded female coupling element and said male coupling element are formed of a reinforced plastic material.

7. The connecting apparatus as defined in claim 6 wherein the reinforced plastic material consists of whiskered graphite fibers and an epoxy resin binder.

8. The connecting apparatus as defined in claim 7 wherein the whiskered fibers are silicon carbide crystals formed integrally on said graphite fibers.

9. A connecting apparatus for coupling ends of wire conductors terminating in mutually interfitting pin and socket elements, comprising:
   a first deformable cone-shaped body member having a base fixedly secured to one conductor end and a truncated tapered portion extending from said base;
   said first body member having an interior cavity of a shape substantially conforming to the exterior configuration of said body member and an opening therein providing access to said cavity;
   a second cone-shaped body member fixedly attached to the other conductor end and configured to fit within said interior cavity of said first body member;
   a threaded female coupling element having an interior surface surrounding said first body member and said one conductor end;

a threaded male coupling element surrounding said second body member and said other conductor end;

said male coupling element including a conical surface conforming to said exterior configuration of said first body member for wedging said first body member against said second body member and against a portion of said interior of said female coupling element to securely fasten the conductor ends and seal the same from the exterior environment.

References Cited

UNITED STATES PATENTS 3,124,406   3/1964   Cook.
3,328,744   6/1967   Fiske _____ 339—61

RICHARD E. MOORE, Primary Examiner

JOSEPH H. McGLYNN, Assistant Examiner

U.S. Cl. X.R.

339—89, 278